Oct. 7, 1930.  K. M. McLAUGHLIN  1,777,500
INDICATOR
Filed May 14, 1930

Inventor:
Kenneth M. McLaughlin
By Cornelius D. Ehret
his Attorney.

Patented Oct. 7, 1930

1,777,500

UNITED STATES PATENT OFFICE

KENNETH M. McLAUGHLIN, OF PHILADELPHIA, PENNSYLVANIA, ASSIGNOR TO ATWATER KENT MANUFACTURING COMPANY, OF PHILADELPHIA, PENNSYLVANIA, A CORPORATION OF PENNSYLVANIA

INDICATOR

Application filed May 14, 1930. Serial No. 452,198.

My invention relates to indicators and particularly to dial and pointer mechanism for association with the tuning devices of radio receiving apparatus.

The reading of the indications of the present dials or scales of radio receiving sets for example, requires a substantially fixed position of the operator, or at least decidedly limits his position to one more or less directly in front of the dial. In accordance with my invention, the scale is on a depressed or concave surface generated by revolution of a straight or a curved line and specifically on the interior of a conical member parallel with the base of the cone which affords close or exact reading of the entire scale while permitting wide latitude in the position of the operator.

My invention further resides in the features of construction and arrangement hereinafter described and claimed.

For an understanding of my invention and for illustration of one of the forms which it may take reference is to be had to the accompanying drawings in which.

Figure 2:
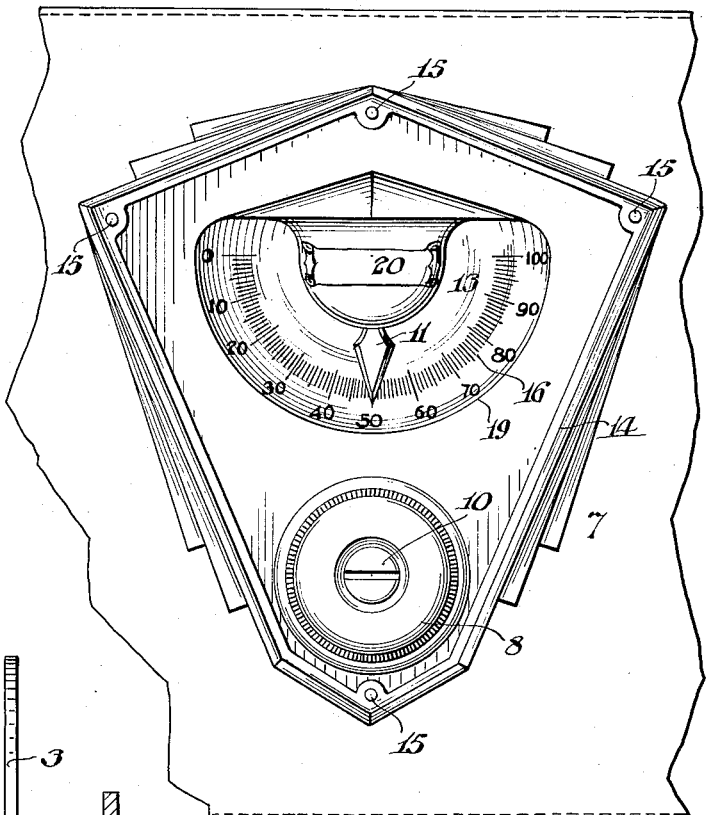
Fig. 2 is a front elevation of structure shown in Fig. 1.
Figure 1:
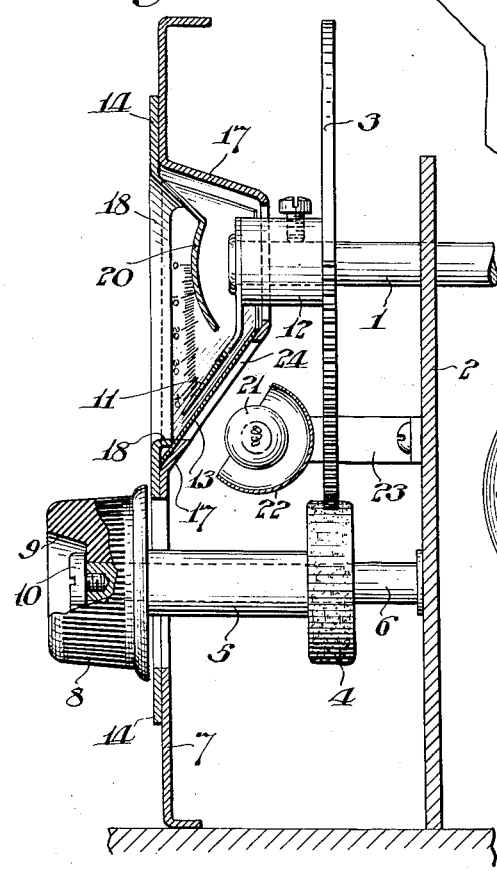
Fig. 1 is a side elevational view in section and with parts broken away of a tuning control for a radio receiver.

Upon the end shaft 1 which may be the operating shaft of a tuning device for radio receiving apparatus, for example, the shaft of a variable condenser, which projects through the supporting panel 2, is mounted a disk 3, whose periphery is preferably serrated or notched for engagement with the roller 4, of rubber or like material, secured to the hollow spindle 5 rotatably mounted on the stud shaft 6 which projects forwardly of the panel 2. To the outer end of the spindle which projects through the front panel 7 of the radio receiving apparatus is suitably secured an adjusting knob 8 provided with a recess 9 for receiving a screw 10 which threadably engages the end of the stationary stud shaft 6 and the under surface of whose head engages the bottom of the recess 9 to position the adjusting knob.

Upon rotation of the knob 8 the shaft 1 is rotated to effect movement of the rotors of the tuning condensers, for example, to tune radio apparatus for receiving a desired signal.

Visually to indicate the setting or position of the condenser rotors, a pointer or index member 11 is suitably attached to the forward end of the hub 12 of the disk 3, and cooperates with a scale member 13, preferably of transparent or translucent material, as celluloid, held in position with respect thereto by the escutcheon plate 14 secured as by screws or rivets 15 to the front panel 7.

Figure 3:
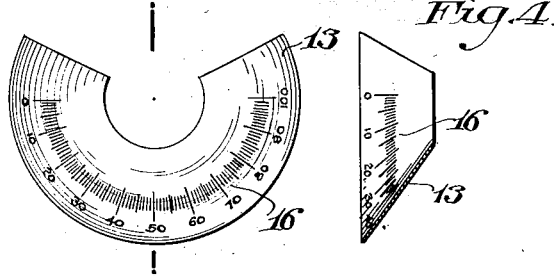
Fig. 3 is a detail view on reduced scale and in front elevation of the scale shown in Figs. 1 and 2.
Figure 4:
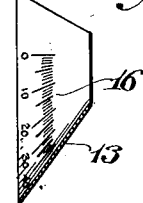
Fig. 4 is a side section of the scale taken on line 4—4 of Fig. 3.

The scale member, as shown most clearly in Figs. 3 and 4 presents a concave surface to the eye of an operator positioned in front of the panel 7, so that the scale or markings, and the position of the pointer with respect to the scale is clearly visible through a wide angle, permitting the operator while adjusting the tuning devices by knob 8, to be in any one of many positions as well as directly in front of the scale. Preferably the scale member is a section of a truncated cone, whose axis substantially coincides with the axis of rotation of shaft 1, although it will be understood that it may be a portion of a sphere, or any other surface of revolution generated by a straight or curved line. The pointer or index 11 extends at right angles to shaft 1 for some distance and then at its outer end extends parallel to and closely adjacent the scale 16, marked or engraved upon the scale member 13, to avoid parallax.

Preferably the front panel, as by a stamping or punching operation is provided with a depression 17, to form a flange, against which the scale is clamped by the shoulder 18 extending inwardly of the opening 19 in the escutcheon plate 14 through which the scale and pointer are visible. Preferably and as indicated the escutcheon plate 14 is also provided with a shield 20 which projects substantially to the rear of panel 7 for concealing the end of shaft 1 and associated parts.

An electric bulb 21, preferably provided with a reflector 22 and mounted upon a bracket 23, extending forwardly of the panel 2 is positioned in back of the scale adjacent an opening or window 24 in the depression 17 of the front panel 7, to illuminate it and to increase the visibility of the graduations, as well as to enhance the appearance of the apparatus generally.

For brevity of the appended claims, it shall be understood that the terms "cone", "conical", as applied to the scale member 13, or equivalent, shall comprehend any surface of revolution generated by revolution of a curved line as well as of a straight line.

What I claim is:

1. Indicating mechanism comprising a rotatable shaft, a fixed cone-shaped member, a scale on the inner surface of said member, and an arm carried by said shaft terminating in a pointer extending parallel with said inner surface and closely adjacent the scale thereon.

2. Indicating mechanism comprising a panel having an opening therein, a cone-shaped member converging rearwardly of said panel and visible through the opening therein, a scale on the inner surface of said member, a rotatable shaft disposed behind said panel, and a pointer movable with said shaft and cooperating with said scale.

3. Indicating mechanism comprising a panel having a depression therein, a cone-shaped member, a plate secured to said panel for holding said member to said panel, a scale on the inner surface of said member visible from the front of said panel, a rotatable shaft, and a pointer movable therewith disposed within said depression for cooperating with said scale.

4. Indicating mechanism comprising a panel having an opening therein provided with a rearwardly extending flange, a cone-shaped member, an apertured plate secured to the front of said panel for clamping said member against said flange, a scale on the inner surface of said member visible through the openings in said plate and panel, a rotatable shaft, and a pointer movable therewith cooperating with said scale.

5. Indicating mechanism comprising a panel having an opening therein, a cone-shaped member positioned to the rear of said panel and visible through said opening, a scale on the inner surface of said member, a rotatable shaft disposed behind said panel, a pointer movable therewith and cooperating with said scale, and means adjustable from the front of said panel for effecting movement of said shaft.

6. Indicating mechanism for radio receiving apparatus comprising a panel having an opening therein, a cone-shaped member, an apertured plate holding said member against said panel, a scale on the inner surface of said member visible through the openings in said plate and panel, a rotatable shaft connected to a tuning element disposed behind said panel, a pointer movable therewith and cooperating with said scale to indicate the position of said tuning element, and structure projecting through said plate and panel adjacent said scale adjustable to change the setting of said tuning element.

7. Indicating mechanism for radio receiving apparatus comprising a panel having an opening therein, apertured supporting structure extending rearwardly of said opening and having a flange contiguous thereto, a translucent cone-shaped scale member carried by said supporting member and extending across the aperture thereof, a plate mounted upon the front of said panel having an upper rearwardly and downwardly projecting flange extending into said panel opening and a lower rearwardly and upwardly projecting flange extending into said opening and clamping said scale-member to said supporting member, and a movable pointer passing between said upper flange and said supporting member for cooperation with said scale member.

8. Indicating mechanism for radio receiving apparatus comprising a panel having an opening therein, apertured supporting structure extending rearwardly of said opening, a translucent cone-shaped scale member carried by said supporting member and extending across the aperture thereof, a plate mounted upon the front of said panel having a rearwardly and downwardly projecting flange extending into said panel opening, and a movable pointer passing between said flange and said supporting structure for cooperation with said scale member.

KENNETH M. McLAUGHLIN.